United States Patent
Kubota et al.

(10) Patent No.: US 9,531,892 B2
(45) Date of Patent: Dec. 27, 2016

(54) IMAGE PROCESSING SYSTEM, PORTABLE TERMINAL APPARATUS, FILE PROCESSING METHOD, AND RECORDING MEDIUM

(71) Applicant: KONICA MINOLTA, INC., Chiyoda-ku, Tokyo (JP)

(72) Inventors: Hirokazu Kubota, Otsu (JP); Junichi Hase, Osaka (JP); Kazusei Takahashi, Nishinomiya (JP); Kazuya Anezaki, Itami (JP); Kenji Matsuhara, Kawanishi (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 14/516,295

(22) Filed: Oct. 16, 2014

(65) Prior Publication Data
US 2015/0116765 A1    Apr. 30, 2015

(30) Foreign Application Priority Data
Oct. 31, 2013    (JP) ................. 2013-227714

(51) Int. Cl.
G06F 3/12    (2006.01)
H04N 1/00    (2006.01)

(52) U.S. Cl.
CPC ...... *H04N 1/00307* (2013.01); *H04N 1/00946* (2013.01); *H04N 2201/0012* (2013.01); *H04N 2201/0094* (2013.01)

(58) Field of Classification Search
None
See application file for complete search history.

(56) References Cited

U.S. PATENT DOCUMENTS

2005/0060341 A1    3/2005  Shiina
2005/0270564 A1*  12/2005  Yun .............................. 358/1.15
(Continued)

FOREIGN PATENT DOCUMENTS

JP    2001290620 A    10/2001
JP    2005057491 A    3/2005
JP    2011034551 A    2/2011

OTHER PUBLICATIONS

Japanese Office Action (and English translation thereof) dated Aug. 18, 2015, issued in counterpart Japanese Application No. 2013-227714.

*Primary Examiner* — Marivelisse Santiago Cordero
*Assistant Examiner* — Neil R McLean
(74) *Attorney, Agent, or Firm* — Holtz Holtz & Volek PC

(57) ABSTRACT

An image processing system includes an image processing apparatus and a portable terminal apparatus. The image processing apparatus includes: a first USB connector; and a command transmitter that transmits a file manipulation command. The portable terminal apparatus includes: a second USB connector; a detector that detects that the portable terminal apparatus is connected to the first USB connector via the second USB connector; a memory being capable of storing a plurality of first folders; a register that registers address information of a Web service, the Web service being combined with at least one first folder stored on the memory; a mounting portion that accesses the Web service and mounts at least one second folder of the Web service onto the at least one first folder; and a controller that obtains a file from the Web service to transfer to the image processing apparatus upon the file manipulation command being received.

8 Claims, 6 Drawing Sheets

(56) References Cited

U.S. PATENT DOCUMENTS

2009/0144629 A1\* 6/2009 Ferlitsch et al. .............. 715/736
2009/0228614 A1\* 9/2009 Hwang ........................... 710/16
2010/0225962 A1\* 9/2010 Okigami et al. ............. 358/1.15
2011/0026069 A1   2/2011 Jesudason et al.
2014/0201512 A1\* 7/2014 Seethaler et al. ................. 713/2

\* cited by examiner

| Folder | Service | User ID | Password | Address |
|---|---|---|---|---|
| A | One's Own Cloud | AAAAA | PW_AAAAA | http:/www··· |
| B | Evernote | BBBBB | PW_BBBBB | http:/www··· |
| C | Public Cloud | CCCCC | PW_CCCCC | ··· |
| D | Another Company's Cloud | DDDDD | PW_DDDDD | ··· |
| E | External FTP Server | EEEEE | PW_EEEEE | ··· |
| ··· | ··· | ··· | ··· | ··· |

| MFP | Command to be directed to a memory area of an embedded memory of the app on the portable terminal | Command to be transferred to the network (over FTP, for example) |
|---|---|---|
| Open a registered folder (folder A of FIG. 4) | cd | Ftp xxx.co.jp<br>Registered ID<br>Registered password<br>ls |
| Open a subordinate folder (a folder "A_SUB" subordinate to the folder A of FIG. 4) | cd A_SUB | cd A_SUB/••••/••••<br>ls |
| Copy a file by drag-and-drop (file name: AAA.txt) | cp AAA.txt. | get AAA.txt. |

FIG.6

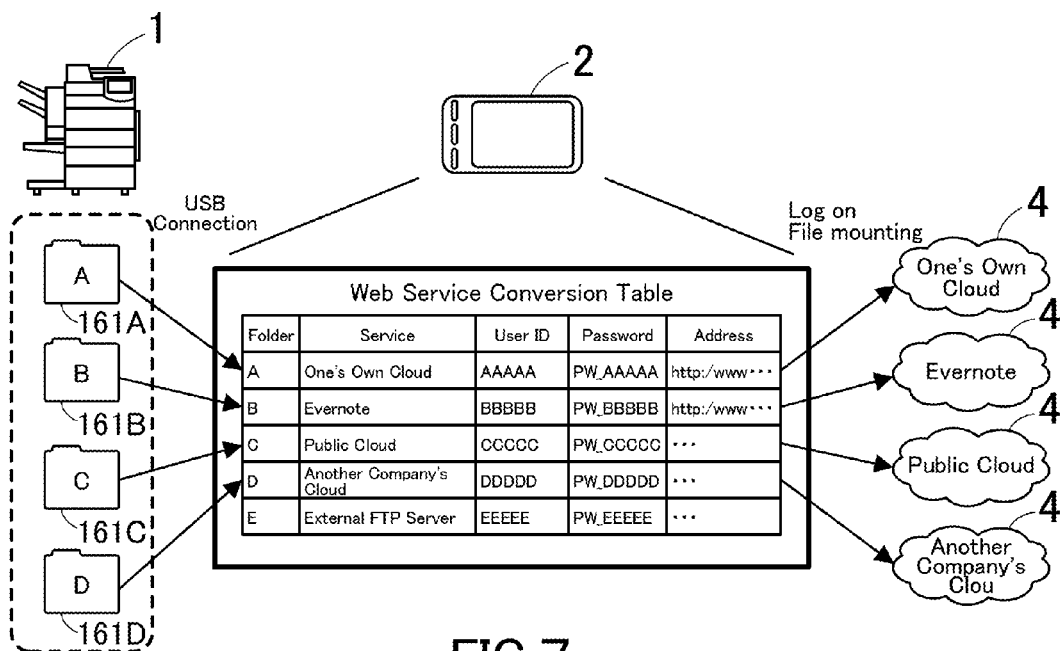

FIG.7

IMAGE PROCESSING SYSTEM, PORTABLE TERMINAL APPARATUS, FILE PROCESSING METHOD, AND RECORDING MEDIUM

This application claims priority under 35 U.S.C. §119 to Japanese Patent Application No. 2013-227714 filed on Oct. 31, 2013, the entire disclosure of which is incorporated herein by reference in its entirety.

BACKGROUND OF THE INVENTION

Field of the Invention

The present invention relates to: an image processing system being provided with: an image processing apparatus, such as a printer, which is not connected to a network; and a portable terminal apparatus, such as a smartphone or a tablet computer terminal, which is connected to the portable terminal apparatus via USB and connected to a network; a portable terminal apparatus; a file processing method to be implemented by the portable terminal apparatus; and a non-transitory computer-readable recording medium storing a file processing program.

Description of the Related Art

The following description sets forth the inventor's knowledge of related art and problems therein and should not be construed as an admission of knowledge in the prior art.

To obtain a desired file from a Web service onto an image processing apparatus, such as a printer, which is not connected to a network, the user needed to download the file onto a universal serial bus (USB) memory or a portable terminal apparatus, such as a smartphone, then to copy to the image processing apparatus.

Before downloading the file onto the USB memory or the portable terminal apparatus, the user further needed to finish all preparations as the following: logging onto the Web service, accessing a directory having the file, selecting and downloading the file, which was pretty troublesome.

There have been a known technique that allows the user to connect the portable terminal apparatus to the image processing apparatus and download a file through a telephone circuit to print the file (for example, Japanese Unexamined Patent Publications No. 2001-290620 and No. 2005-057491).

These techniques disclosed in Japanese Unexamined Patent Publications No. 2001-290620 and No. 2005-057491 do not provide a solution to the problem: in these publications, the user does not download a file from the Web service by operating the image processing apparatus and is still bothered by the need of finishing all preparations before downloading.

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

SUMMARY OF THE INVENTION

A first aspect of the present invention relates to an image processing system including an image processing apparatus not being connected to a network and a portable terminal apparatus being connected to the network, the image processing apparatus including:
a first USB connector; and
a command transmitter that transmits a file manipulation command to the portable terminal apparatus, the portable terminal apparatus being connected to the image processing apparatus via the first USB connector, the portable terminal apparatus including:
a second USB connector;
a detector that detects that the portable terminal apparatus is connected to the first USB connector of the image processing apparatus via the second USB connector;
a memory being capable of storing a plurality of first folders;
a register that registers address information of a Web service, the Web service being combined with at least one first folder stored on the memory;
a mounting portion that accesses the Web service with the registered address information upon the portable terminal apparatus being connected to the image processing apparatus via the second USB connector and that mounts at least one second folder of the Web service onto the at least one first folder; and
a controller that obtains a target file from the Web service to transfer to the image processing apparatus upon the file manipulation command being received from the image processing apparatus, the file manipulation command being directed to the at least one second folder of the Web service, the at least one second folder being mounted onto the at least one first folder.

A second aspect of the present invention relates to a portable terminal apparatus being connected to a network, the portable terminal apparatus being capable of accessing an image processing apparatus not being connected to the network, the image processing apparatus including a first USB connector, the portable terminal apparatus including:
a second USB connector;
a detector that detects that the portable terminal apparatus is connected to the first USB connector of the image processing apparatus via the second USB connector;
a memory being capable of storing a plurality of first folders;
a register that registers address information of a Web service, the Web service being combined with at least one first folder stored on the memory;
a mounting portion that accesses the Web service with the registered address information upon the portable terminal apparatus being connected to the image processing apparatus via the second USB connector and that mounts at least one second folder of the Web service onto the at least one first folder; and
a controller that obtains a target file from the Web service to transfer to the image processing apparatus upon a file manipulation command being received from the image processing apparatus, the file manipulation command being directed to the at least one second folder of the Web service, the at least one second folder being mounted onto the at least one first folder.

A third aspect of the present invention relates to a file processing method to be implemented by a portable terminal apparatus being connected to a network, the portable terminal apparatus being capable of accessing an image processing apparatus not being connected to the network, the image processing apparatus including a first USB connector, the portable terminal apparatus including a second USB connector, the file processing method including:
detecting that the portable terminal apparatus is connected to the first USB connector of the image processing apparatus via the second USB connector;

registering address information of a Web service, the Web service being combined with at least one first folder stored on a memory, the memory being capable of storing a plurality of first folders;

accessing the Web service with the registered address information upon the portable terminal apparatus being connected to the image processing apparatus via the second USB connector and mounting at least one second folder of the Web service onto the at least one first folder; and obtaining a target file from the Web service to transfer to the image processing apparatus upon a file manipulation command being received from the image processing apparatus, the file manipulation command being directed to the at least one second folder of the Web service, the at least one second folder being mounted onto the at least one first folder.

A fourth aspect of the present invention relates to a non-transitory computer-readable recording medium for a portable terminal apparatus being connected to a network, the portable terminal apparatus being capable of accessing an image processing apparatus not being connected to the network, the image processing apparatus including a first USB connector, the portable terminal apparatus including a second USB connector, the non-transitory computer-readable recording medium storing a file processing program to make a computer of the portable terminal apparatus execute:

detecting that the portable terminal apparatus is connected to the first USB connector of the image processing apparatus via the second USB connector;

registering address information of a Web service, the Web service being combined with at least one first folder stored on a memory, the memory being capable of storing a plurality of first folders;

accessing the Web service with the registered address information upon the portable terminal apparatus being connected to the image processing apparatus via the second USB connector and mounting at least one second folder of the Web service onto the at least one first folder; and obtaining a target file from the Web service to transfer to the image processing apparatus upon a file manipulation command being received from the image processing apparatus, the file manipulation command being directed to the at least one second folder of the Web service, the at least one second folder being mounted onto the at least one first folder.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which:

FIG. 6 is a correspondence table showing that file manipulations on the image processing apparatus indicates the respective commands for the portable terminal apparatus;

FIG. 7 is a view illustrating a frame format of the concept that the data storages of the Web services are virtually accessible to the folders of the portable terminal apparatus in accordance with the Web service conversion table upon the portable terminal apparatus being connected to the image processing apparatus via USB;

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

Hereinafter, an embodiment of the present invention will be described with reference to the accompanying drawings.

Figure 1:
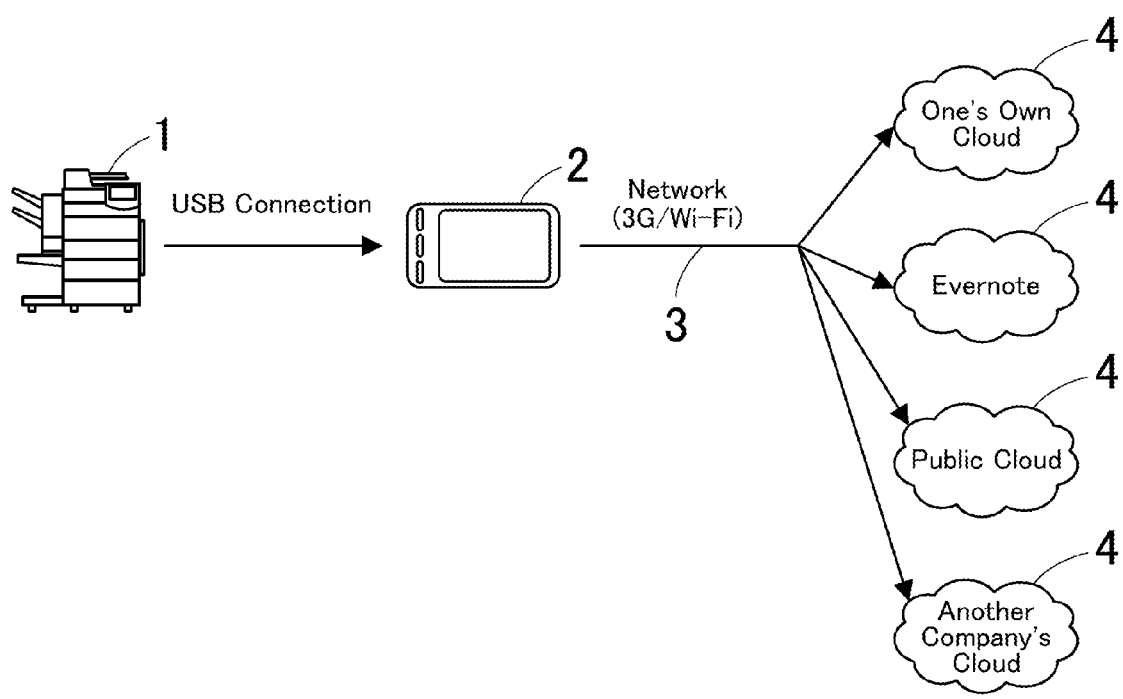
FIG. 1 illustrates a configuration of an image processing system according to one embodiment of the present invention.

FIG. 1 is a view illustrating a configuration of an image processing system according to one embodiment of the present invention. The image processing system is provided with an image processing apparatus 1 and a portable terminal apparatus 2, which are capable of accessing each other via USB.

The image processing apparatus 1 is not connected to a network 3, i.e., is not capable of accessing the network 3. The portable terminal apparatus 2 is connected to the network 3, i.e., is capable of accessing the network 3. By accessing a Web service 4, such as one's own cloud, a public cloud, and another company's cloud, through the network 3, the portable terminal apparatus 2 is allowed to download a file and others from the Web service 4.

In this embodiment, a MFP, which has various functions, such as a copier function, a printer function, a scanner function, and a facsimile function, is employed as the image processing apparatus 1, which does not mean that the image processing apparatus should be limited to this example. Hereinafter, the image processing apparatus will also be referred to as "MFP". The portable terminal apparatus will also be referred to as "portable terminal". An apparatus, such as a smartphone or a tablet computer terminal, is employed as the portable terminal 2.

Figure 2:
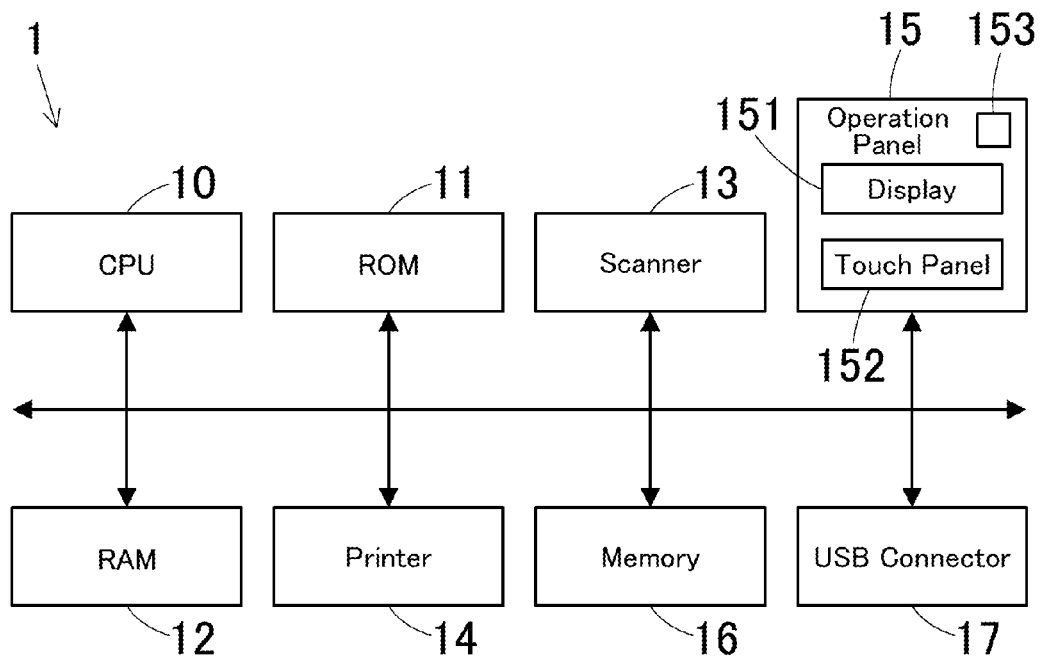
FIG. 2 is a block diagram illustrating an electrical configuration of an image processing apparatus.

FIG. 2 is a block diagram illustrating an electrical configuration of the MFP 1.

As illustrated in FIG. 2, the MFP 1 is provided with: a central processing unit (CPU) 10, i.e., a calculator device that controls the entire MFP 1; a read only memory (ROM) 11 that stores programs to be executed by the CPU 10 and other data; a random access memory (RAM) 12 that serves as a work area for the CPU 10 to execute the programs; a scanner 13 that obtains image data by optically reading a document put on a platen not shown in the figure; a printer 14 that prints image data on printing paper; an operation panel 15 that allows the user to provide input to the MFP 1; a memory 16 that stores image data obtained by the scanner 13, files obtained from external apparatuses such as the portable terminal 2, application programs, and others; a USB connector 17; and others.

The operation panel 15 is provided with a display 151, a touch panel 152, and an operating keyboard 153. The touch panel 152 includes: a display 151, i.e., a liquid-crystal display for example; and a touch panel 152, i.e., an optical touch-panel or capacitance position indicator that is laid on the display 151. The touch panel 152 identifies the position of a touch event on an operation screen that appears on the display 151.

The USB connector 17, which is provided with a USB port, a USB interface, a USB device, and others, is capable of accessing the portable terminal 2 and other apparatuses via USB.

Upon file manipulation being performed by the user, the CPU 10 transmits a file manipulation command to the portable terminal 2 that is connected to the USB connector 17.

Figure 3:
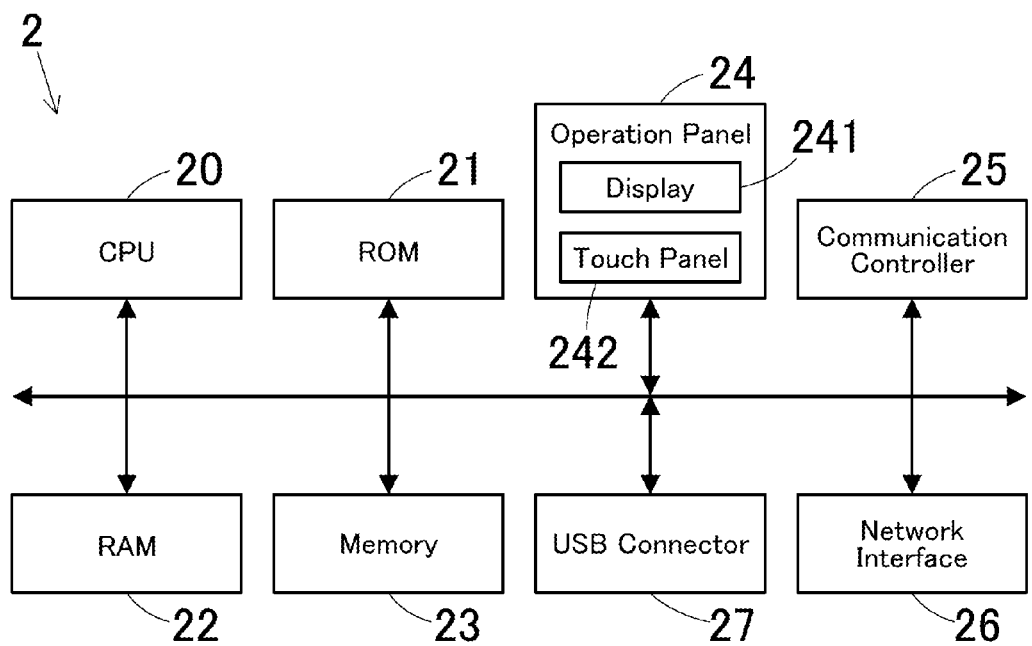
FIG. 3 is a block diagram illustrating an electrical configuration of a portable terminal apparatus.

FIG. 3 is a block diagram illustrating an electrical configuration of the portable terminal 2.

As illustrated in FIG. 3, the portable terminal 2 is provided with: a CPU 20, i.e., a calculator device that controls the entire portable terminal 2; a ROM 21 that stores programs to be executed by the CPU 20 and other data; a RAM 22 that serves as a work area for the CPU 20 to execute the programs; a memory 23 that stores image data files, document data files, and other files and information; an operation panel 24 that allows the user to provide input to the portable terminal 2; a communication controller 25 that controls communication with a base station not shown in the figure through a telephone circuit; a network interface 26 that controls communication through a network; and a USB connector 27 that connects to an external apparatus such as the MFP 1 via USB. The USB connector 27 is provided with a USB interface, a USB device, and others.

The operation panel 24 may have a similar configuration to that of the operation panel 15 of the MFP 1. In one instance, the configuration includes: a display 241, i.e., a liquid-crystal display for example; and a touch panel 242, i.e., an optical touch-panel or capacitance position indicator that is laid on the display 241.

Upon the portable terminal 2 being connected to the MFP 1 via the USB connector 27, the CPU 20 detects this event to output a detection signal.

Figures 4, 5:
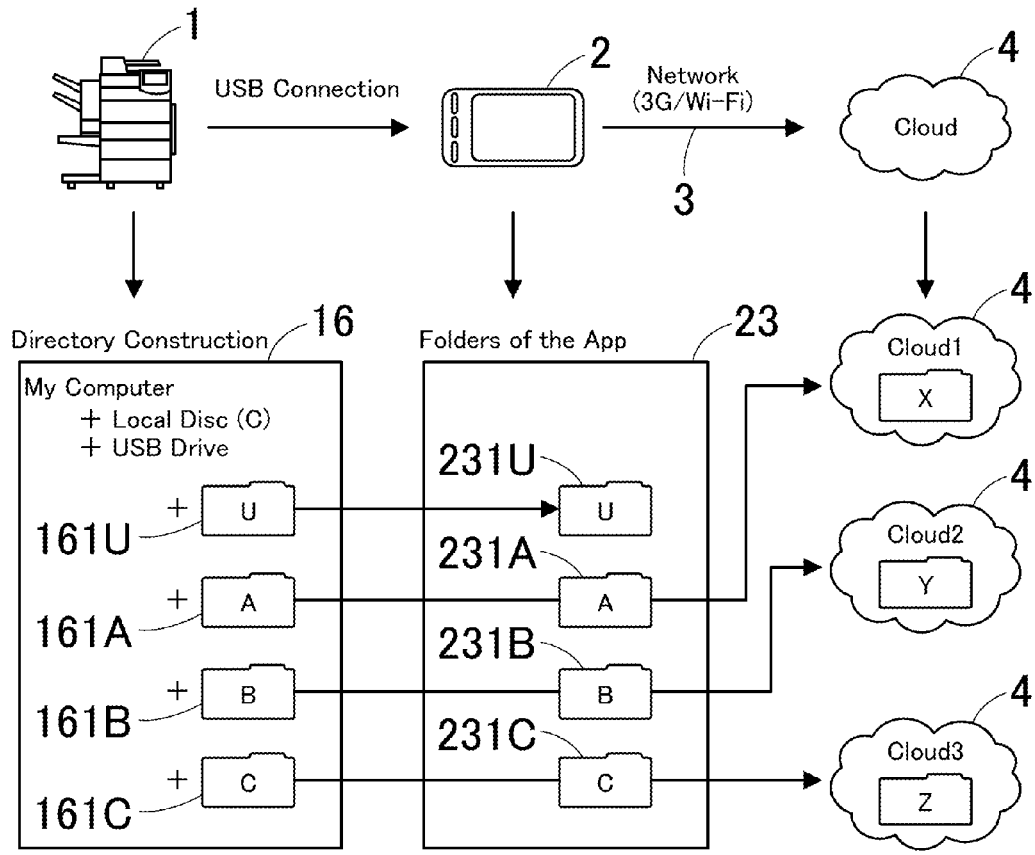
FIG. 4 is a view illustrating a frame format of the concept that data storages of Web services are virtually accessible to folders of the portable terminal apparatus upon the portable terminal apparatus being connected to the image processing apparatus via USB.
FIG. 5 is a view illustrating a Web service conversion table.

FIG. 4 illustrates a frame format of the concept that data storages of a Web service (also to be referred to as "cloud") 4 are virtually accessible to folders of the portable terminal 2 after the portable terminal 2 is connected to the MFP 1 via USB.

A local folder 231U of the portable terminal 2 is accessible to a local folder 161U of the MFP 1; cloud folders X-Z are virtually accessible to local folders A, B, and C (161A, 161B, and 161C) of the MFP 1, respectively, via local folders A, B, and C (231A, 231B, and 231C) of the portable terminal 2.

To virtually access data storages of the cloud 4 from the local folders of the portable terminal 2, the user at first needs to configure settings by operating an application (also to be referred to as "app") of the portable terminal 2, that is, the user needs to combine the folders X, Y, and Z of the cloud 4, which are to be virtually accessible to a USB drive of the MFP 1 that is not connected to the network, with the local folders A, B, and C (231A, 231B, and 231C) owned by the application of the portable terminal 2, respectively. The user can create the local folders A, B, and C (231A, 231B, and 231C) of the portable terminal 2 in the same way as creating a folder on a USB memory.

More specifically, the user creates the local folders 231A-C of the portable terminal 2 then enters values for the local folders 231A-C to complete a Web service conversion table of FIG. 5. For example, as for the local folder A (231A), the user determines one's own cloud as the Web service 4, registers a user ID and a password for access to the folder, and determines an address of a data storage as an access point to the one's own cloud. As necessary, the user also determines an address of a directory subordinate to the data storage. Similarly, the user configures the settings for the local folders B, C, and D (231B, 231C, and 231D).

Every Web service 4 has its own file system (to be described later), thus the user further needs to connect identical operations across different Web services 4 as indicated by the table of FIG. 6. For example, the user performs file manipulation on the MFP 1 and if it indicates an instruction to open the registered local folder A (231A), then the app of the portable terminal 2 sets "cd" as a command to be directed to a memory area of the embedded memory (memory 23) and sets "Ftp xxx.co.jp" as a command to be directed to the network over FTP. Subsequently, a user ID, a password, and others are set. Meanwhile, if it indicates an instruction to open a folder "A_SUB" that is subordinate to the local folder A (231A), then the app of the portable terminal 2 sets "cd A_SUB" as a command to be directed to the memory and sets "cd A_SUB/ . . . / . . . " as a command to be directed to the network. If it indicates an instruction to copy a file by drag-and-drop or whatever, then the app of the portable terminal 2 performs the same accordingly.

FIG. 7 is a view illustrating a frame format of the concept that the Web services 4 are accessible to the respective local folders 231A, 231B, 231C, and 231D in accordance with the settings as described above, upon the portable terminal 2 being connected to the MFP 1 via USB.

When a USB connection with the MFP 1 is detected by the CPU 20 of the portable terminal 2, the portable terminal 2 automatically accesses the Web services 4, which are combined with the respective local folders 231A, 231B, 231C, and 231D of the portable terminal 2, to log onto the Web services 4 with the registered user IDs and passwords, in accordance with the Web service conversion table of FIG. 5 and the correspondence table of FIG. 6.

After that, the portable terminal 2 accesses directories (folders) subordinate to the data storages of the Web services 4, which are registered on the Web service conversion table, and the subordinate directories are mounted on the respective local folders of the portable terminal 2.

Figure 8:
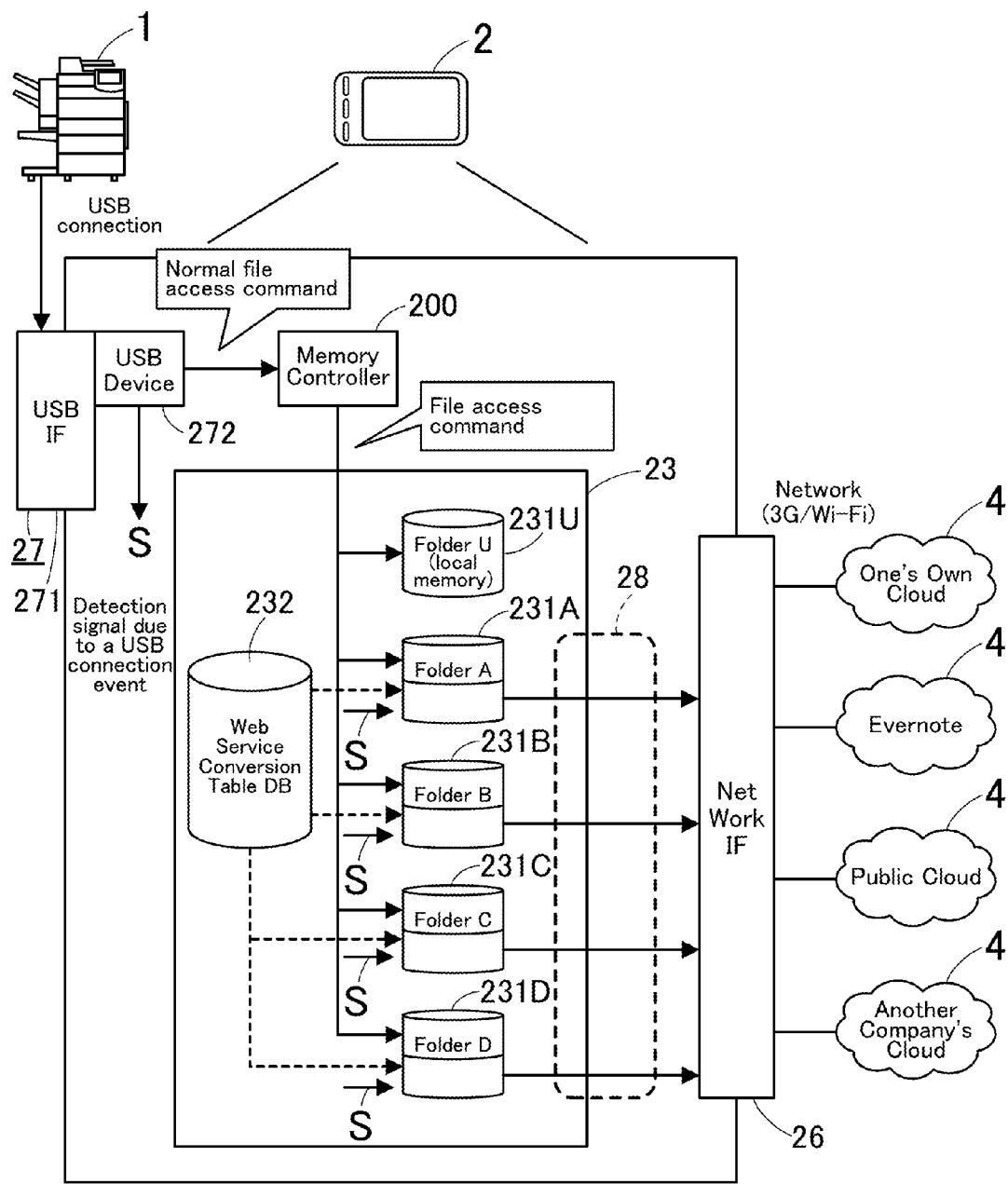
FIG. 8 illustrates the details of a functional configuration of an application that is installed on the portable terminal apparatus.

Hereinafter, an operation of the image processing system of FIG. 1 will be described with reference to FIG. 8 which illustrates the details of a functional configuration of the app of the portable terminal 2.

Upon the portable terminal 2 being connected to the MFP 1 via USB device 272, the CPU 20 detects this event to output a detection signal S. This detection signal S serves as a trigger to allow the portable terminal 2 to log onto the Web services 4, which are combined with the respective local folders 231A, 231B, 231C, and 231D, in accordance with the Web service conversion table. Subsequently, the directories (folders) of cloud storages, are mounted on the respective local folders 231A, 231B, 231C, and 231D. The mechanism or system for mounting directories on folders, which is achieved by an existing technique such as a network file system 28, enables file sharing. "FNS" can be a representative example of the network file system.

After the cloud directories (folders) are mounted on the respective local folders 231A, 231B, 231C, and 231D of the portable terminal 2, the user performs file manipulation on the MFP 1, for example, the user gives an instruction to open a specific folder or to provide a file list. Such a command is converted to a USB protocol command and transferred to the portable terminal 2.

The portable terminal 2 receives the USB protocol command. Subsequently, the USB protocol command is converted to a normal file access command and transferred to the memory controller 200 that controls the memory 23. The memory controller 200 is configured as a function of the CPU 20.

The memory controller 200 receives the file access command. Subsequently, the file access command is interpreted by the memory controller 200 as being directed to the memory 23 of the portable terminal 2 and is transferred to the specific local folder 231A, 231B, 231C, or 231D. Here, it is not judged whether the file access command is directed to the local memory 231U or the local folder with which the cloud 4 is combined (for example, the local folder A (231A)).

If the file access command is a file manipulation command to be directed to the local folder A (231A) (for example, a file list transfer command), the portable terminal 2 obtains a file list from the cloud storage. The obtained file list is transferred to the memory controller 200 and is further transferred to the MFP 1.

Meanwhile, if file manipulation on the MFP 1 indicates an instruction to copy a file stored on the local folder A (231A) of the portable terminal 2 for example, a copy of the file is stored on a memory area of the memory 23 of the portable terminal 2 such that the user can see the file by accessing the USB memory of the portable terminal 2 from the MFP 1. Subsequently, the file is copied to the MFP 1. In other words, after the cloud folders are mounted on the respective local folders 231A, 231B, 231C, and 231D of the portable terminal 2, the user can see the cloud folders and files only by accessing the USB memory from the MFP 1.

Upon being connected to the MFP 1 via USB, the portable terminal 2 automatically accesses the Web service 4 at an address registered in advance and the directories (folders) of the Web service 4 are automatically mounted on the respective folders 231A, 231B, 231C, and 231D. In other words, while the user does not need to finish all the preparations: logging onto the Web service 4, accessing a directory having a desired file, selecting and downloading the file, the folders of the Web service 4 are automatically mounted on the respective local folders 231A, 231B, 231C, and 231D of the portable terminal 2. Consequently, the user is allowed to perform file manipulation, for example, the user gives an instruction to obtain a desired file, by operating the MFP 1 that is not connected to the network, while believing that the file is stored on the USB memory, not on the Web service 4.

Figure 9:
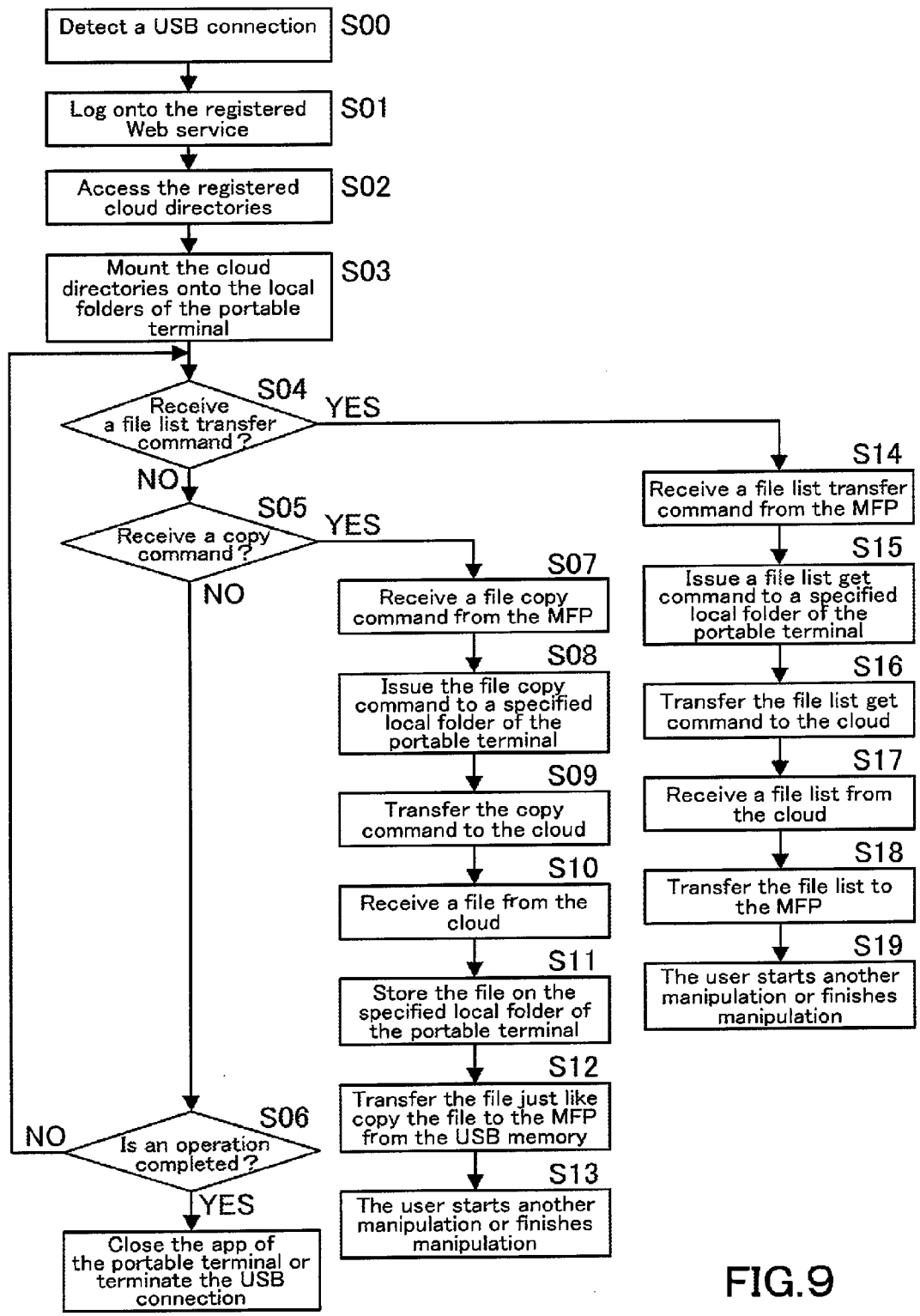
FIG. 9 is a flowchart representing an operation of the portable terminal apparatus.

FIG. 9 is a flowchart representing an operation of the portable terminal 2. The flowchart is executed by the CPU 20 of the portable terminal 2 in accordance with an operation program stored on a recording medium such as the ROM 21 or the memory 23.

In Step S00 of FIG. 9, a USB connection with the MFP 1 is detected. The portable terminal 2 logs onto the registered Web services 4 in accordance with the Web service conversion table in Step S01 and accesses the registered cloud directories (folders) of the clouds 4 in Step S02. Subsequently, in Step S03, the local folders 231A, 231B, 231C, and 231D of the portable terminal 2 are opened and the cloud directories are mounted on the respective local folders 231A, 231B, 231C, and 231D of the portable terminal 2.

When the user performs file manipulation on the MFP 1, for example, the user gives an instruction to obtain a file list or to copy a file, the MFP 1 transmits a file list transfer command or a file copy command to the portable terminal 2.

In Step S04, it is judged whether or not a file list transfer command (a file list get command) is received from the MFP 1. If such a command is received from the MFP 1 (YES in Step S04), it is transferred to a memory controller 200 in Step S14.

Subsequently, in Step S15, a file list get command is issued to one of the local folders of the portable terminal 2 specified by the command from the MFP 1, by the memory controller 200. In Step S16, the command is further transferred to the cloud 4.

A file list is received from the cloud 4 in Step S17 and is further transferred to the MFP 1 in Step S18. In Step S19, the user starts another manipulation or finishes manipulation.

Back to Step S04, if a file list transfer command is not received (NO in Step S04), then it is judged in Step S05 whether or not a file copy command a file is received from the MFP 1. If such a command is received from the MFP 1 (YES in Step S05), it is transferred to the memory controller 200 in Step S07.

Subsequently, in Step S08, a file copy command is issued to one of the local folders specified by the command from the MFP 1, by the memory controller 200. the command received from the MFP 1 is directed to a specified one of the local folders, by the memory controller 200. In Step S09, the command is further transferred to the cloud 4.

A copy of the file is received from the cloud 4 in Step S10 and is stored on the specified local folder of the portable terminal 2 in Step S11. After that, the copy is further transferred to the MFP 1 just like the file is copied to the MFP 1 from the USB memory in Step S12. In Step S13, the user starts another manipulation or finishes manipulation.

Back to Step S05, if a file copy command is not received (NO in Step S05), then it is judged in Step S06 whether or not an operation is completed. If the operation is not completed (NO in Step S06), the routine returns to Step S04. If the operation is completed (YES in Step S06), the application is closed or the USB connection is terminated in Step S20.

While one embodiment of the present invention has been described in detail herein and shown in the accompanying drawings, it should be understood that the present invention is not limited to the foregoing embodiment.

In this embodiment, file manipulation on the MFP 1 indicates an instruction to obtain a file list or to copy a file, which does not mean that the file manipulation should be limited to these examples.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g. of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to". In this disclosure and during the prosecution of this application, means-plus-function or step-plus-function limitations will only be employed where for a specific claim limitation all of the following conditions are present In that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example", and "NB" which means "note well".

What is claimed is:

1. An image processing system comprising:
    a portable terminal apparatus which is connected to a network; and
    an image processing apparatus which is not connected to the network,
    wherein the image processing apparatus comprises:
        a first USB connector; and
        a first hardware processor which is configured to transmit a file manipulation command to the portable terminal apparatus, in a state in which the portable terminal apparatus is connected to the image processing apparatus via the first USB connector,
    wherein the portable terminal apparatus comprises:
        a second USB connector;
        a memory which is capable of storing a plurality of first folders; and
        a second hardware processor which is configured to:
            detect that the portable terminal apparatus is connected to the first USB connector of the image processing apparatus via the second USB connector;
            register address information of a plurality of Web services, the Web services being combined with the respective first folders stored in the memory;
            access the Web services with the registered address information upon the portable terminal apparatus being connected to the image processing apparatus via the second USB connector, and mount second folders of the Web services onto the respective first folders; and
            upon receipt of a file manipulation command from the image processing apparatus which is directed to one of the second folders of the Web services which is mounted onto one of the first folders, obtain a target file from the Web service to transfer to the image processing apparatus, the Web service corresponding to the file manipulation command, by converting the file manipulation command to a command determined for the corresponding Web service with reference to a conversion table and transferring the command to the corresponding Web service, the conversion table determining different commands for the respective Web services depending on the file manipulation command.

2. The image processing system as recited in claim 1, wherein the file manipulation command indicates an instruction to obtain a file list or to copy the target file.

3. A portable terminal apparatus which is connected to a network, and which is capable of accessing an image processing apparatus which is not connected to the network, the image processing apparatus comprising a first USB connector, the portable terminal apparatus comprising:
    a second USB connector;
    a memory which is capable of storing a plurality of first folders; and
    a hardware processor which is configured to:
        detect that the portable terminal apparatus is connected to the first USB connector of the image processing apparatus via the second USB connector;
        register address information of a plurality of Web services, the Web services being combined with the respective first folders stored in the memory;
        access the Web services with the registered address information upon the portable terminal apparatus being connected to the image processing apparatus via the second USB connector, and mount second folders of the Web services onto the respective first folders; and
        upon receipt of a file manipulation command from the image processing apparatus which is directed to one of the second folders of the Web services which is mounted onto one of the first folders, obtain a target file from the Web service to transfer to the image processing apparatus, the Web service corresponding to the file manipulation command, by converting the file manipulation command to a command determined for the corresponding Web service with reference to a conversion table and transferring the command to the corresponding Web service, the conversion table determining different commands for the respective Web services depending on the file manipulation command.

4. The portable terminal apparatus as recited in claim 3, wherein the file manipulation command indicates an instruction to obtain a file list or to copy the target file.

5. A file processing method to be implemented by a portable terminal apparatus which is connected to a network, and which is capable of accessing an image processing apparatus which is not connected to the network, the image processing apparatus comprising a first USB connector, the portable terminal apparatus comprising a second USB connector, the file processing method comprising:
    detecting that the portable terminal apparatus is connected to the first USB connector of the image processing apparatus via the second USB connector;
    registering address information of a plurality of Web services, the Web services being combined with respective first folders stored in a memory;

accessing the Web services with the registered address information upon the portable terminal apparatus being connected to the image processing apparatus via the second USB connector, and mounting second folders of the Web services onto the respective first folders; and upon receipt of a file manipulation command from the image processing apparatus which is directed to one of the second folders of the Web services which is mounted onto one of the first folders, obtaining a target file from the Web service to transfer to the image processing apparatus, the Web service corresponding to the file manipulation command, by converting the file manipulation command to a command determined for the corresponding Web service with reference to a conversion table and transferring the command to the corresponding Web service, the conversion table determining different commands for the respective Web services depending on the file manipulation command.

6. The file processing method as recited in claim 5, wherein the file manipulation command indicates an instruction to obtain a file list or to copy the target file.

7. A non-transitory computer-readable recording medium having stored thereon a file processing program that is executable by a computer of a portable terminal apparatus, wherein the portable terminal apparatus is connected to a network, and is capable of accessing an image processing apparatus which is not connected to the network, the image processing apparatus comprising a first USB connector, the portable terminal apparatus comprising a second USB connector, and wherein the file processing program executable by the computer of the portable terminal apparatus to cause the computer to perform functions comprising:

detecting that the portable terminal apparatus is connected to the first USB connector of the image processing apparatus via the second USB connector;

registering address information of a plurality of Web services, the Web services being combined with respective first folders stored in a memory;

accessing the Web services with the registered address information upon the portable terminal apparatus being connected to the image processing apparatus via the second USB connector, and mounting second folders of the Web services onto the respective first folders; and upon receipt of a file manipulation command from the image processing apparatus which is directed to one of the second folders of the Web services which is mounted onto one of the first folders, obtaining a target file from the Web service to transfer to the image processing apparatus, the Web service corresponding to the file manipulation command, by converting the file manipulation command to a command determined for the corresponding Web service with reference to a conversion table and transferring the command to the corresponding Web service, the conversion table determining different commands for the respective Web services depending on the file manipulation command.

8. The non-transitory computer-readable recording medium as recited in claim 7, wherein the file manipulation command indicates an instruction to obtain a file list or to copy the target file.

\* \* \* \* \*